(12) United States Patent
Shiokawa et al.

(10) Patent No.: US 8,164,051 B2
(45) Date of Patent: Apr. 24, 2012

(54) INTERNAL STANDARD MATERIAL, RESIN COMPOSITION, AND MEASUREMENT METHOD

(75) Inventors: Yoshiro Shiokawa, Hachioji (JP); Harumi Maruyama, Inagi (JP); Megumi Nakamura, Tama (JP)

(73) Assignee: Canon Anelva Corporation, Kawasaki-shi (JP)

( * ) Notice: Subject to any disclaimer, the term of this patent is extended or adjusted under 35 U.S.C. 154(b) by 444 days.

(21) Appl. No.: 12/423,462

(22) Filed: Apr. 14, 2009

(65) Prior Publication Data

US 2009/0266981 A1 Oct. 29, 2009

(30) Foreign Application Priority Data

Apr. 25, 2008 (JP) ................... 2008-115331

(51) Int. Cl.
*B01D 59/44* (2006.01)
(52) U.S. Cl. ......... 250/281; 250/282; 250/288; 436/173
(58) Field of Classification Search .............. 250/281, 250/282, 288; 436/173
See application file for complete search history.

(56) References Cited

U.S. PATENT DOCUMENTS

| | | | |
|---|---|---|---|
| 5,128,405 A * | 7/1992 | Sugiyama | ............ 524/538 |
| 6,479,814 B2 | 11/2002 | Shiokawa et al. | |
| 2005/0049335 A1 * | 3/2005 | Lee et al. | ............ 524/87 |
| 2009/0266979 A1 | 10/2009 | Nakamura et al. | |
| 2009/0272894 A1 | 11/2009 | Shiokawa et al. | |

FOREIGN PATENT DOCUMENTS

| | | |
|---|---|---|
| GB | 2028866 A | 3/1980 |
| JP | 55-031878 A | 3/1980 |
| JP | 2001-273868 A | 10/2001 |

OTHER PUBLICATIONS

P. Bartl et al., "Direct Determination of Antioxidants in Aviation Turbine Fuels by Gas Chromatography / Mass Spectrometry", Fresenius' Journal of Analytical Chemistry, vol. 310, Nos. 3-4, 1982, pp. 250-251.
S.W. Chen et al., "Analysis of Additives in Polyethylene with Desorption Chemical Ionization / Tandem Mass Spectrometry", Applied Spectroscopy, vol. 47, Issue 6, 1993, pp. 844-851.
Maruyama et al., "Improvement in Accuracy of a Quantitative Analysis of an Organic Additive Contained in a Resin by Ion Attachment Mass Spectroscopy", Summaries of Lectures in the 56th Annual Meeting of the Japan Society of Analytical Chemistry, 2007, p. 272, P2008.

* cited by examiner

*Primary Examiner* — Michael Maskell
(74) *Attorney, Agent, or Firm* — Fitzpatrick, Cella, Harper & Scinto

(57) ABSTRACT

An internal standard material to be added to a specimen containing a material to be measured when measuring the content of the material to be measured by performing mass spectrometry on the specimen includes a hindered phenol compound.

6 Claims, 2 Drawing Sheets

INTERNAL STANDARD MATERIAL, RESIN COMPOSITION, AND MEASUREMENT METHOD

BACKGROUND OF THE INVENTION

1. Field of the Invention

The present invention relates to an internal standard material to be used when measuring the content of a material by mass spectrometry, and a measurement method and resin composition using the internal standard material.

2. Description of the Related Art

Recently, according to RoHS (Restriction of Hazardous Substances) defined by the European Union (EU), when exporting a certain product inside the EU area, it is necessary to certify that the content of a brominated flame retardant contained in a resin used in the exported product does not exceed a prescribed value. Therefore, social demands for accurate determination of the amount of brominated flame retardant as an object material of RoHS are increasing.

With this social background, when measuring the content of a material to be measured by performing mass spectrometry on a specimen containing the material, an internal standard material is added to the specimen in addition to the material to be measured, and the material to be measured is quantitatively measured in comparison with the internal standard material. Http://www.canon-anelva.co.jp/iams/new-products has disclosed quantitative analysis of a retardant as an object of RoHS performed by using IAMS (Ion Attachment Mass Spectrometry).

Under the circumstances, when measuring the content of a brominated flame retardant by mass spectrometry, an internal standard material to be added to a specimen of mass spectrometry is required to meet the conditions that the internal standard material does not thermally decompose, has no toxicity, and has a mass number close to that of a material to be measured. However, no internal standard material that satisfies all these conditions and enables accurate quantitative measurement of a material to be measured has been found. A "specimen" herein mentioned is a material prepared to undergo measurement performed by a mass spectrometry apparatus, and containing a material to be measured, internal standard material, and the like.

SUMMARY OF THE INVENTION

The present invention has been made in consideration of the above situation, and has its object to provide an internal standard material that enables accurate quantitative measurement of a material to be measured by using mass spectrometry, and a measurement method and resin composition using the internal standard material.

According to the first aspect of the present invention, there is provided an internal standard material to be added to a specimen containing a material to be measured when measuring a content of the material to be measured by performing mass spectrometry on the specimen, wherein the internal standard material includes a hindered phenol compound.

According to the second aspect of the present invention, there is provided a resin composition to be added to a specimen containing a material to be measured when measuring a content of the material to be measured by performing mass spectrometry on the specimen, wherein the resin composition contains an internal standard material and a base resin of the internal standard material, and the internal standard material includes a hindered phenol compound.

According to the third aspect of the present invention, there is provided a method of measuring a content of a material to be measured by performing mass spectrometry on a specimen containing the material to be measured, wherein the specimen includes a hindered phenol compound as an internal standard material.

1,6-hexanediolbis[3-(3,5-di-t-butyl-4-hydroxyphenyl) propionate] (CAS#: 35074-77-2) is represented by formula $C_{40}H_{62}O_6$, has the following structure, and has a mass number of 638.

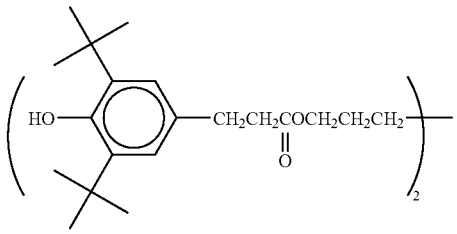

The present invention can provide an internal standard material that enables accurate quantitative measurement of a material to be measured by using mass spectrometry, and a measurement method and resin composition using the internal standard material.

Further features of the present invention will become apparent from the following description of exemplary embodiments with reference to the attached drawings.

DESCRIPTION OF THE EMBODIMENT

The embodiment of the present invention will now be explained in detail below with reference to the accompanying drawings.

Figure 1:
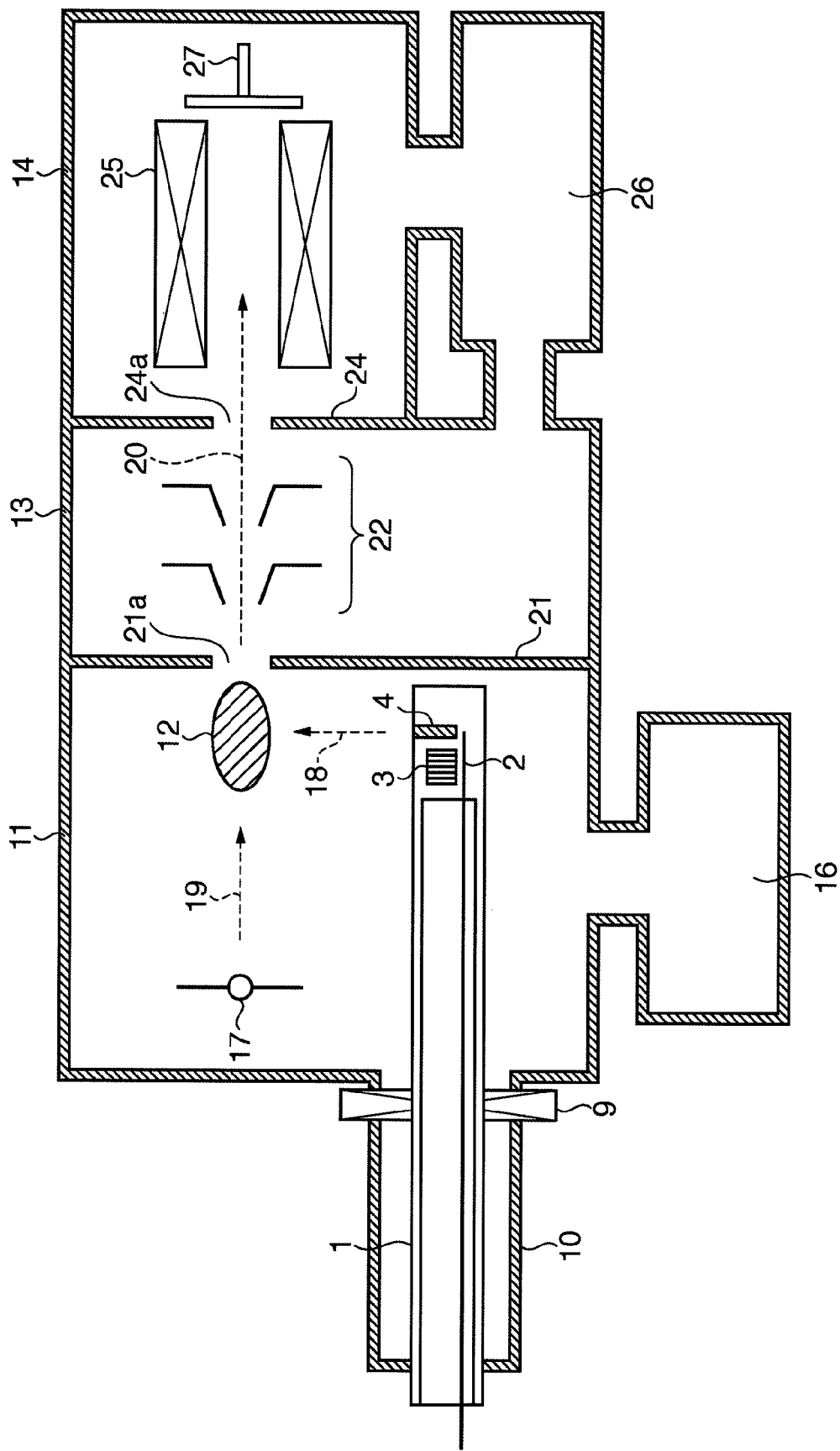
FIG. 1 is a view showing the structure of an ion attachment mass spectrometry apparatus for use in mass spectrometry of a specimen according to the present invention.

FIG. 1 shows an example of a mass spectrometry apparatus that attaches metal ions to a gasified material to be measured by using direct-introduction probe (DIP), as an example of a mass spectrometry apparatus for measuring a gasified material to be measured obtained by gasifying a specimen by heating.

As shown in FIG. 1, a mass spectrometry method according to this embodiment will be explained below by using an ion attachment mass spectrometry apparatus that produces no fragment, as an example of the mass spectrometry apparatus. Note that as an ionization method that produces no other fragment, it is also possible to use a PTR (Proton Transfer Reaction) using $H^+$ transfer from $H_3O^+$, and an IMS (Ion Molecule Spectrometer) using charge exchange from mercury ions or the like.

First, the arrangement of the ion attachment mass spectrometry apparatus will be explained. A metal ion emitter 17 is installed in an ion attachment chamber 11, and ions are attached in an attachment region 12. The ion attachment chamber 11 is evacuated by a dedicated evacuation pump 16, and the emitter 17 and attachment region 12 are set in the same vacuum environment.

The metal ion emitter 17 emits, for example, positively charged lithium ions ($Li^+$) toward the attachment region 12. Also, a heater 3 of a probe 1 gasifies a specimen 4 by heating, and the generated gas of the specimen 4 is supplied to the attachment region 12. The probe 1 is introduced from a pre-evacuation chamber 10 connected to the ion attachment chamber 11 via a gate valve 9. The probe 1 has a thermocouple 2 for measuring the temperature of the specimen 4.

The gas of the specimen 4 gasified by heating rises toward the attachment region 12 as indicated by an arrow 18, and the metal ions emitted as indicated by an arrow 19 attach to the gas of the specimen 4 in the attachment region 12, thereby generating an ion-attached gas.

Referring to FIG. 1, an arrow 20 indicates the locus of the movement of the metal ions and ion-attached gas generated in the ion attachment chamber 11. Note that the introduction position of the probe 1 need only be a position where the same vacuum environment is maintained in the ion attachment chamber 11, and is not limited to the position shown in FIG. 1.

A partition 21 having a hole 21a is formed between the ion attachment chamber 11 and an intermediate chamber 13. The metal ions and ion-attached gas move through the hole 21a in the partition 21. A lens 22 to which a steady potential is applied by a mechanism (not shown) for applying a predetermined voltage is installed in the intermediate chamber 13. The lens 22 achieves an electrostatic lens effect.

A partition 24 having a hole 24a is formed between the intermediate chamber 13 and a mass spectrometry chamber 14. The ion-attached gas moves to the mass spectrometry chamber 14 through the hole 24a in the partition 24. A mass spectrometer 25 such as a Q-pole (quadrupole) mass spectrometer is installed in the mass spectrometry chamber 14. The mass spectrometry chamber 14 shares an evacuation pump 26 with the intermediate chamber 13. A secondary electron multiplier 27 for receiving the ion-attached gas is installed on the right side of the mass spectrometer 25 in FIG. 1.

The ion attachment chamber 11, intermediate chamber 13, and mass spectrometry chamber 14 are set in a low-pressure ambient lower than the atmospheric pressure by evacuation performed by the evacuation pumps 16 and 26. In the ion attachment chamber 11, the emitter 17 made of an oxide of an alkali metal generates positively charged metal ions such as $Li^+$ when heated. The emitter 17 is heated by an electric current supplied when a power supply (not shown) applies a predetermined voltage. The emitter 17 thus heated emits metal ions. An electric field or the like transports the emitted metal ions to the attachment region 12 inside the ion attachment chamber 11.

An example of an internal standard material to be added to the specimen 4 is 1,6-hexanediolbis[3-(3,5-di-t-butyl-4-hydroxyphenyl)propionate] (CAS#: 35074-77-2). When a material to be measured contains a resin, the internal standard material is preferably mixed in a base resin of the resin and added in the form of a resin composition to the specimen 4, in order to increase the measurement accuracy. That is, the internal standard material is desirably mixed in the base resin having a thermal conductivity close to that of the resin contained in the material to be measured, thereby forming a resin composition. In addition, if the form of the internal standard material is a powder, dispersion of the internal standard material in the base resin improves.

The content of the internal standard material in the base resin is preferably 0.1% to 5% as a weight ratio. This is so because the sensitivity becomes insufficient if the content is less than 0.1%, and becomes too high if the content exceeds 5%. As the base resin, it is possible to use, for example, polystyrene.

Note that the weight ratio of the resin composition containing the internal standard material to the specimen is desirably 10% to 75%. This is so because a weight ratio of less than 10% makes weighing difficult, and a weight ratio exceeding 75% makes the sensitivity too high.

Furthermore, the direct-introduction-probe-method (DIP) is used as shown in FIG. 1 as the method of introducing the specimen into the mass spectrometry apparatus and gasifying the specimen by heating, but the direct-exposure-probe-method (DEP) may also be used.

The direct-introduction probe method is a method in which a material to be measured in the form of a solid or liquid is placed in a cup and introduced into the ion attachment chamber in a vacuum, and gasified in the chamber by heating performed by a heater or infrared radiation. On the other hand, the direct-exposure-probe-method is a method in which a filament is coated with a material to be measured in the form of a solid or liquid, and inserted into the ion attachment chamber in a vacuum, and the material to be measured is gasified in the chamber by heating by supplying an electric current to the filament.

An example of the specimen that can be quantitatively analyzed by adding the internal standard material according to this embodiment is a brominated flame retardant contained in a resin. Examples of the brominated flame retardant are decabromodiphenylether (DeBDE, CAS#: 1163-19-5) and decabromobiphenyl (DeBB, CAS#: 13654-09-6).

As already described above, the internal standard material is required to meet the conditions that the internal standard material added to the specimen does not thermally decompose when gasifying the specimen by heating, has no toxicity, and has a mass number close to that of a material to be measured.

An example of the internal standard material is a hindered phenol compound. The hindered phenol compound is a compound having a branched alkyl group in the ortho position of a hydroxyl group of a phenol compound. However, a hydroxyl group may also be substituted by an alkoxy group. 1,6-hexanediolbis[3-(3,5-di-t-butyl-4-hydroxyphenyl)propionate] (CAS#: 35074-77-2) is preferably used among the hindered phenol compounds.

As will be explained in a measurement method (to be described later), 1,6-hexanediolbis[3-(3,5-di-t-butyl-4-hydroxyphenyl)propionate] (CAS#: 35074-77-2) as the internal standard material does not decompose at 300° C. necessary for gasification, and has no toxicity. Also, the mass numbers of decabromophenylether (DeBDE, CAS#: 1163-19-5) and decabromobiphenyl (DeBB, CAS#: 13654-09-6) are respectively 959 Da and 943 Da that are close enough to the mass number of the internal standard material.

Accordingly, the internal standard material of this embodiment can be used as the internal standard material of a specimen containing a material to be measured, provided that the above-mentioned conditions that, for example, the gasification temperature is close to that of the internal standard material and the mass numbers of the internal standard material and the material to be measured are close are met.

A mass spectrometry method of quantitatively analyzing, for example, decabromodiphenylether (DeBDE, CAS#: 1163-19-5) as a material to be measured by the internal standard material according to this embodiment by using the mass spectrometry apparatus shown in FIG. 1 will be explained below.

0.21 mg of a resin composition containing 1% of 1,6-hexanediolbis[3-(3,5-di-t-butyl-4-hydroxyphenyl)propionate] (CAS#: 35074-77-2) as the internal standard material in polystyrene as a base resin were weighed. Subsequently, 1.10 mg of a specimen containing decabromodiphenylether (DeBDE, CAS#: 1163-19-5) as a material to be measured were weighed.

The resin composition containing the internal standard material and the material to be measured were charged as a specimen 4 in the probe 1, and the probe 1 was introduced into the ion attachment chamber 11 after the ion attachment chamber 11 was set at a predetermined vacuum degree. In this state, it was possible to measure the vacuum degrees and the like of the intermediate chamber 13 and mass spectrometry chamber 14.

Then, while the metal ion emitter 17 was heated, the specimen 4 was gasified as it was heated to 300° C. for a set time.

Figure 2:
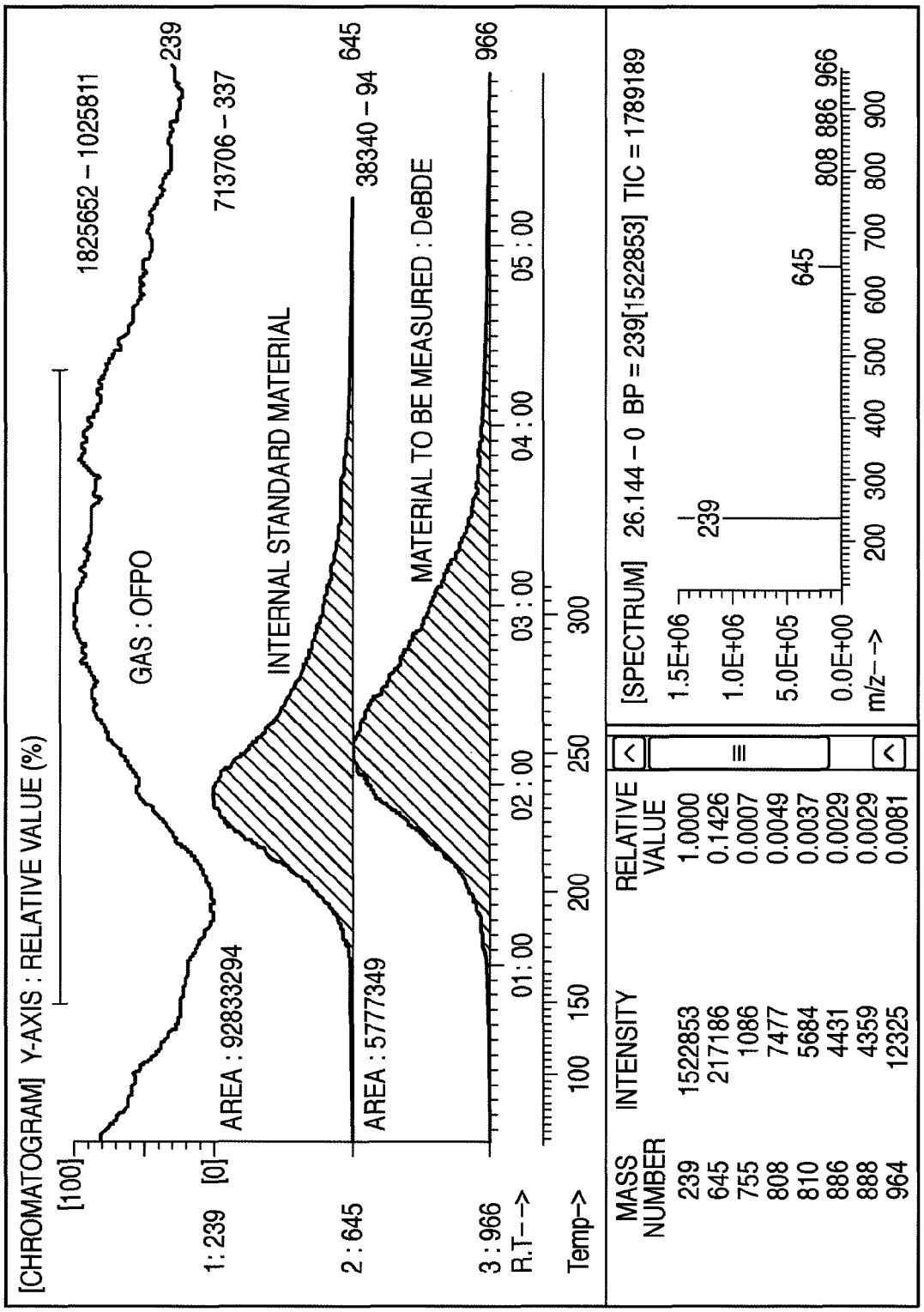
FIG. 2 is a graph showing measurement results obtained by using the specimen according to the present invention.

FIG. 2 shows data obtained by the above arrangement.

A graph in the uppermost stage indicates the detection amount of octafluoropentanol (OFPO) that is always constantly supplied. Although correction is normally performed by an internal standard material like this in order to check sensitivity variations during measurement, this correction is found to be unsatisfactory as will be described later.

Referring to FIG. 2, the middle stage indicates the detection value of 1,6-hexanediolbis[3-(3,5-di-t-butyl-4-hydroxyphenyl)propionate] (CAS#: 35074-77-2) as the internal standard material, and the lower stage indicates the detection value of decabromodiphenylether (DeBDE, CAS#: 1163-19-5) as the material to be measured.

As shown in FIG. 2, the area of 1,6-hexanediolbis[3-(3,5-di-t-butyl-4-hydroxyphenyl)propionate] (CAS#: 35074-77-2) was 92833294, and that of decabromodiphenylether (DeBDE, CAS#: 1163-19-5) was 5777349.

This ratio was fit to a calibration curve prepared in advance. Consequently, the amount of decabromodiphenylether (DeBDE, CAS#: 1163-19-5) as the material to be measured was 0.67 µg, and the concentration of DeBDE as the material to be measured in the resin was 610 ppm.

After that, the same measurement as described above was repetitively performed five times for three cases, that is, cases in which 1,6-hexanediolbis[3-(3,5-di-t-butyl-4-hydroxyphenyl)propionate] (CAS#: 35074-77-2) was used as the internal standard material, OFPO was used as the internal standard material, and no internal standard material was used, and the repetition accuracy (relative standard deviation) was checked.

The relative standard deviation was 4.3% when 1,6-hexanediolbis[3-(3,5-di-t-butyl-4-hydroxyphenyl)propionate] (CAS#: 35074-77-2) was used as the internal standard material, 13.4% when OFPO was used as the internal standard material, and 10.8% when no internal standard material was used. That is, the use of 1,6-hexanediolbis[3-(3,5-di-t-butyl-4-hydroxyphenyl)propionate] (CAS#: 35074-77-2) as the internal standard material increased the accuracy of measurement of decabromodiphenylether as the brominated flame retardant.

The same measurement accuracy increasing effect as above was confirmed for a decabromobiphenyl (DeBB, CAS#: 13654-09-6) as the brominated flame retardant.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-115331, filed Apr. 25, 2008, which is hereby incorporated by reference herein in its entirety.

What is claimed is:

1. An internal standard material to be added to a specimen containing a material to be measured when measuring a content of the material to be measured by performing mass spectrometry on the specimen,
wherein the internal standard material is 1,6-hexanediolbis[3-(3,5-di-t-butyl-4-hydroxyphenyl)propionate], and
wherein the material to be measured is a brominated flame retardant.

2. The internal standard material according to claim 1, wherein the material to be measured is decabromodiphenylether or decabromobiphenyl.

3. A resin composition to be added to a specimen containing a material to be measured when measuring a content of the material to be measured by performing mass spectrometry on the specimen,
wherein the resin composition contains an internal standard material and a base resin of said internal standard material,
wherein said internal standard material is 1,6-hexanediolbis[3-(3,5-di-t-butyl-4-hydroxyphenyl)propionate], and
wherein the material to be measured is a brominated flame retardant.

4. The resin composition according to claim 3, wherein the material to be measured is decabromodiphenylether or decabromobiphenyl.

5. A method of measuring a content of a material to be measured by performing mass spectrometry on a specimen containing the material to be measured,
wherein the specimen includes 1,6-hexanediolbis[3-(3,5-di-t-butyl-hydroxyphenyl)propionate] as an internal standard material, and
wherein the material to be measured is a brominated flame retardant.

6. The method according to claim 5, wherein the material to be measured is decabromodiphenylether or decabromobiphenyl.

* * * * *